(12) United States Patent
Mermelstein

(10) Patent No.: US 9,482,824 B2
(45) Date of Patent: Nov. 1, 2016

(54) REMOVING UNWANTED LIGHT FROM HIGH-POWER OPTICAL SYSTEMS

(71) Applicant: OFS Fitel, LLC, Norcross, GA (US)

(72) Inventor: Marc Mermelstein, Highland Park, NJ (US)

(73) Assignee: OFS FITEL, LLC

( * ) Notice: Subject to any disclaimer, the term of this patent is extended or adjusted under 35 U.S.C. 154(b) by 134 days.

(21) Appl. No.: 14/206,731

(22) Filed: Mar. 12, 2014

(65) Prior Publication Data
US 2014/0270668 A1    Sep. 18, 2014

Related U.S. Application Data

(60) Provisional application No. 61/787,854, filed on Mar. 15, 2013.

(51) Int. Cl.
| | |
|---|---|
| G02B 6/02 | (2006.01) |
| G02B 6/38 | (2006.01) |
| G02B 6/36 | (2006.01) |
| H01S 3/067 | (2006.01) |
| H01S 3/04 | (2006.01) |
| G02B 6/42 | (2006.01) |
| G02B 6/14 | (2006.01) |
| H01S 3/041 | (2006.01) |
| G02B 6/032 | (2006.01) |

(52) U.S. Cl.
CPC .......... *G02B 6/3814* (2013.01); *G02B 6/3636* (2013.01); *G02B 6/4287* (2013.01); *G02B 6/4296* (2013.01); *H01S 3/0405* (2013.01); *H01S 3/06704* (2013.01); *G02B 6/14* (2013.01); *G02B 2006/0325* (2013.01); *H01S 3/041* (2013.01); *H01S 3/067* (2013.01)

(58) Field of Classification Search
CPC .... G02B 6/02; H01S 3/0405; H01S 3/06704
See application file for complete search history.

(56) References Cited

U.S. PATENT DOCUMENTS

| | | | | |
|---|---|---|---|---|
| 7,010,204 B2* | 3/2006 | Reith | .............. | G02B 6/03627 385/128 |
| 7,306,376 B2* | 12/2007 | Scerbak | .............. | G02B 6/4296 385/76 |
| 7,349,596 B2* | 3/2008 | Anderegg | .............. | G02B 6/26 385/27 |
| 8,027,555 B1* | 9/2011 | Kliner | .............. | G02B 6/2852 385/29 |
| 8,934,508 B2* | 1/2015 | Sakamoto | .......... | G02B 6/02138 372/6 |
| 2014/0205252 A1* | 7/2014 | Tafoya | .............. | G02B 6/02 385/123 |

* cited by examiner

*Primary Examiner* — Daniel Petkovsek
(74) *Attorney, Agent, or Firm* — Sam Han, Esq.

(57) ABSTRACT

The present disclosure is directed to removing unabsorbed cladding light in high-power optical systems. Some embodiments comprise a glass block with a refractive index that is greater than a refractive index of a fiber cladding, and a metal housing that is located external to the glass block. The glass block and the metal housing, in combination, removes excess light.

8 Claims, 2 Drawing Sheets

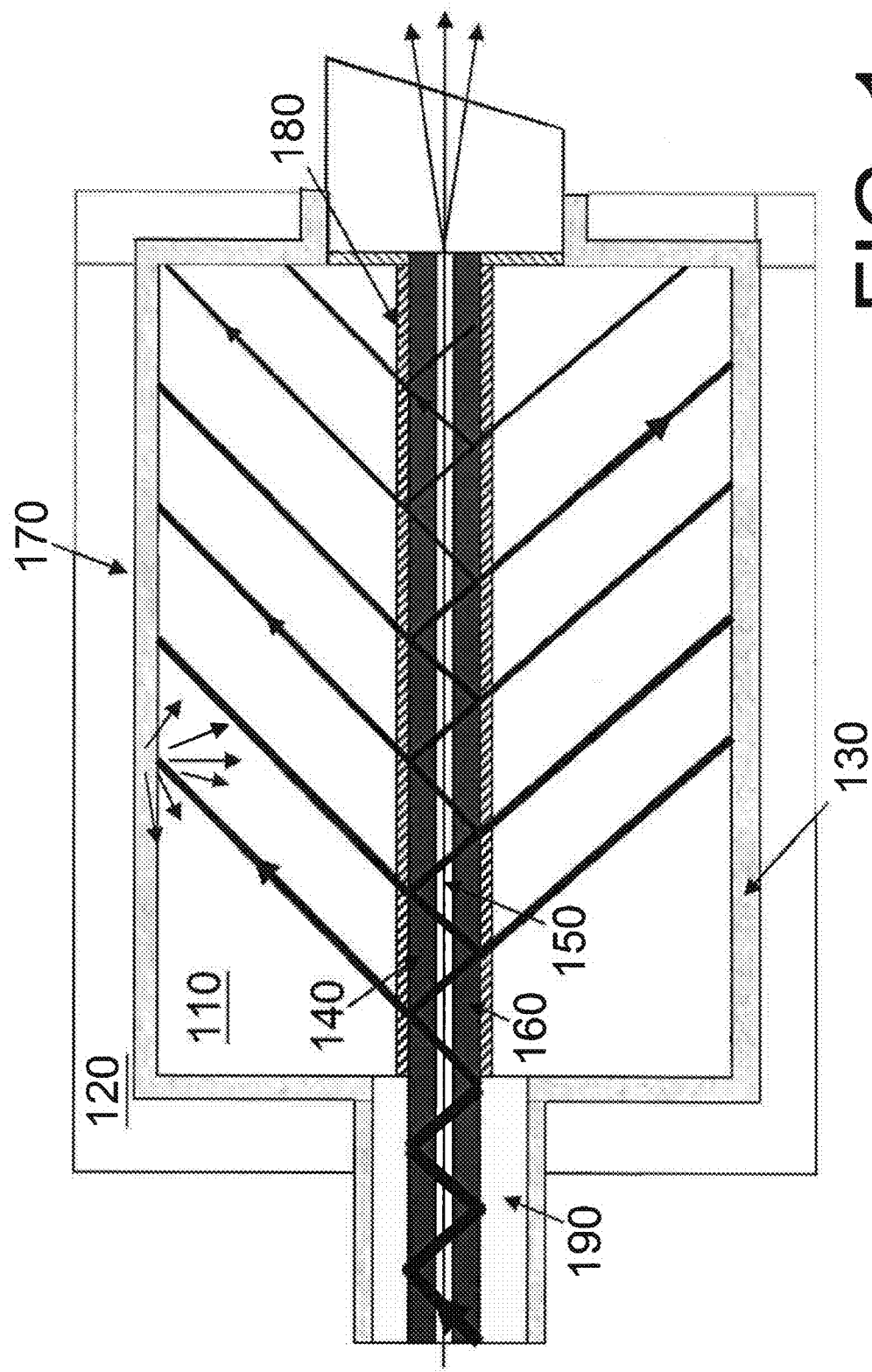

REMOVING UNWANTED LIGHT FROM HIGH-POWER OPTICAL SYSTEMS

CROSS-REFERENCE TO RELATED APPLICATIONS

This application incorporates by reference in its entirety U.S. Provisional Patent Application Ser. No. 61/787,854, filed on 2013 Mar. 15, by Holland and Sullivan, having the title "Glass Buffers," and U.S. patent application Ser. No. 14/206,641, filed on 2014 Mar. 12, filed concurrently with this application, by Holland and Sullivan, having the title "Glass Buffers."

BACKGROUND

1. Field of Disclosure

The present disclosure relates generally to optics and more particularly to high-power optical systems.

2. Description of Related Art

Fiber lasers and optical amplifiers are often used in high-power optical applications. The high power levels employed in these applications can result in elevated temperatures at various points of vulnerability. As a consequence, there are ongoing efforts to mitigate potential overheating within high-power optical systems.

SUMMARY

The present disclosure is directed to removing unwanted cladding light in optical fiber-based high-power systems. Some embodiments comprise a glass block with a refractive index that is greater than a refractive index of a fiber cladding, and a metal housing that is located external to the glass block. The glass block and the metal housing, in combination, remove unwanted cladding light.

BRIEF DESCRIPTION OF THE DRAWINGS

Many aspects of the disclosure can be better understood with reference to the following drawings. The components in the drawing are not necessarily to scale, emphasis instead being placed upon clearly illustrating the principles of the present disclosure. Moreover, in the drawings, like reference numerals designate corresponding parts throughout the several views.

FIG. 1 is a diagram showing one embodiment of an optical fiber with an apparatus for removing unwanted cladding light.

DETAILED DESCRIPTION OF THE EMBODIMENTS

Figure 2A:
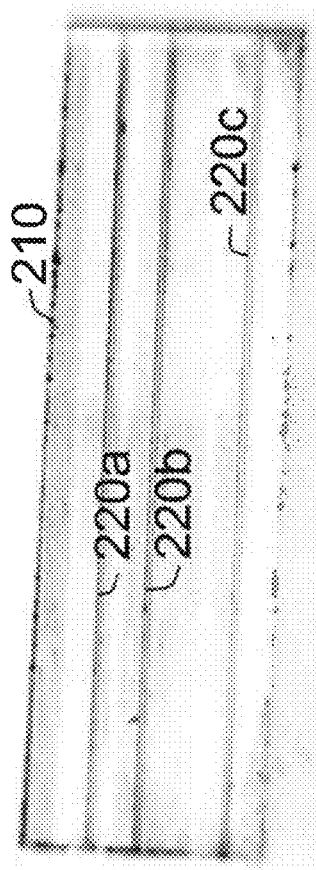
FIG. 2A is a diagram showing a top view of a glass block having machined troughs.

High-power optical applications, such as fiber lasers or fiber amplifiers that deliver many kilowatts (kW) of optical power, can be achieved by multiplexing together many kW-class devices (e.g., lasers or amplifiers). This scalable structure can be achieved by coherent combination, spectral combination, or a hybrid combination scheme. At each stage, these kW-class devices employ several kW of pump light and have been known to operate at an optical-to-optical efficiency of approximately 80 percent (80%). Given this efficiency, it is possible to have several hundred Watts (W) of unused residual pump power propagating in the cladding at the output. It is also possible for high power signal light to be scattered out of the core, such as at bends or splices, causing unwanted signal light to propagate in the cladding.

For example, a 1083 nanometer (nm), 2.0 kW, 10 decibel (dB) amplifier with an optical-to-optical efficiency of 70% and pump light at 976 nm would typically require approximately 2.5 kW of pump power. Thus, at an efficiency of approximately 90%, there may be as much as 750 W of residual pump at the amplifier output. This residual pump power is due to the finite length of the amplifier, which is normally needed to minimize nonlinearities, and incomplete pump mode scrambling along the length of the fiber.

Amplifiers that operate at shorter wavelengths (e.g., less than 1060 nm) often require shorter fiber lengths in order to prevent excessive single-pass gain and spurious lasing. However, these shorter fibers reduce the amount of absorbed pump power, thereby resulting in excess unused pump power. This unused pump power corrupts spectral purity at the output, thereby compromising the ability to multiplex these kW-class devices. Furthermore, the unabsorbed pump light (and other cladding light) generates undesired heating. Consequently, it is desirable to remove this unused pump power at the pump wavelength (and other cladding light) to preserve the spectral purity of the amplifier output that may otherwise interfere with multiplexing schemes and produce unwanted heating.

This disclosure provides systems and methods for addressing this problem of unwanted light in the cladding, such as excess pump light. In particular, the disclosed approaches provide a mechanism to remove unwanted cladding light by embedding an optical fiber in a glass block with an appropriate refractive index. For example, if the optical fiber has a cladding with a refractive index of $n_1$, then a glass block with a refractive index of $n_3$, where $n_3 \geq n_1$ over a temperature range of interest, will result in excess light in the cladding being removed due to the difference in the refractive indices. Preferably, the design and materials are chosen to reduce thermal flux to less than approximately 200 Watts per square inch (W/in$^2$).

Having provided an overview, reference is now made in detail to the description of the embodiments as illustrated in the drawings. While several embodiments are described in connection with these drawings, there is no intent to limit the disclosure to the embodiment or embodiments disclosed herein. On the contrary, the intent is to cover all alternatives, modifications, and equivalents.

FIG. 1 is a diagram showing one embodiment of an optical fiber with an apparatus for removing unwanted cladding light from a high-power optical system, such as an optical fiber amplifier or an optical fiber laser. Specifically, the embodiment of FIG. 1 shows an optical fiber 140 located in a glass block 110. The optical fiber 140 comprises a core 150, a cladding 160, and a low-index coating 190. The cladding 160 has a refractive index of $n_1$.

A fluid 180 is interposed between the glass block 110 and the optical fiber 140, thereby surrounding the optical fiber 140, which resides within a channel in the glass block 110. Preferably, the channel should have dimensions that are approximately 20 percent (%) greater than the outer diameter of the optical fiber 140. Thus, for example, for an optical fiber with an outer diameter of approximately 330 μm, the channel should have a width of less than approximately 400 μm, thereby leaving an average gap distance of approximately 35 μm. As one can appreciate, the channel may be a hole that is bored into the glass block 110 or, in the alternative, may be troughs that are machined into the glass block 110.

The fluid 180 has a refractive index of $n_2$, such that $n_2 \geq n_1$, and has an internal transmittance of $\tau_{fluid}$ such that $\tau_{fluid} \geq 0.999$ over a distance of approximately 100 micrometers (μm). Consequently, the difference in refractive index permits light to escape from the cladding 160 to the fluid 180. Furthermore, due to the high transmittance of the fluid 180, any light that escapes to the fluid 180 will propagate through the fluid 180 without much absorption. Thus, very little heat (if any) will be generated in the fluid 180. For some embodiments, the fluid 180 may be an optical fluid or some type of transparent optical cement, paste, or gel.

As shown in FIG. 1, the glass block 110 has a refractive index of $n_3$, such that $n_3 \geq n_2$, thereby permitting light to escape from the fluid 180 to the glass block 110. For some embodiments, the refractive index of the glass block 110 is approximately 1.7. Additionally, the glass block 110 has a transmittance of $\tau_{glass}$ such that $\tau_{glass} \geq 0.999$ over a distance of approximately 1 centimeter (cm). Again, the high transmittance of the glass block 110 permits propagation of light through the glass block 110 with little absorption. Preferably, the glass block 110 should have dimensions that are sufficiently large so that there is no area in which light is concentrated. By way of example, the glass block 110 may be approximately 5 cm×2 cm×2 cm.

The embodiment of FIG. 1 further comprises a metal housing 170, which is located external to the glass block 110, and a thermal compound 130, which absorbs light, at a glass-metal interface between the glass block 110 and the metal housing 170. Preferably, the metal housing 170 has a thermal conductivity that is greater than approximately 200 Watts per meter-degrees Celsius (W/m-° C.), which results in a heat flux at the glass-metal interface being less than approximately 200 Watts per square inch (W/in²). For some embodiments, the metal housing 170 has a high conductivity and comprises a black coating to increase absorption. Example metals include copper, which has a thermal conductivity of approximately 401 W/m-° C., or black anodized aluminum, which has a thermal conductivity of 205 W/m-° C., thereby permitting efficient heat flow to a cooling element, such as a cold plate (not shown) that may be in contact with the metal housing 170. By using a cold plate with a thermal resistance that is less than approximately 0.15° C.-in²/W, much of the heat that is generated at the glass-metal interface can be efficiently extracted from the system. For some embodiments, the cold plate is a water-cooled cold plate of sufficient heat extraction capacity to maintain an operating temperature that is less than approximately 50° C. at the glass-metal interface. Thus, for example, an optical fiber laser with a pump power of approximately 500 W will result in a heat flux of approximately 25 W/cm² at the glass-metal interface.

Continuing with FIG. 1, in operation, cladding light (shown as entering from the left side of FIG. 1) propagates through the cladding 160. When it reaches the glass block 110, the cladding light is extracted through the fluid 180 and the glass block 110. As the extracted cladding light reaches the glass-metal interface, it is scattered and absorbed by the internal surface of the metal housing 170, thereby generating heat at the glass-metal interface, with some of the heat being absorbed by the thermal compound 130. The remainder of the heat is transmitted through the metal housing 170 to a cooling plate, which removes the heat from the system. As one can appreciate, by providing a glass block 110 with a higher refractive index than the fiber cladding 160, unwanted cladding light can be extracted and removed from the system.

Figure 2B:
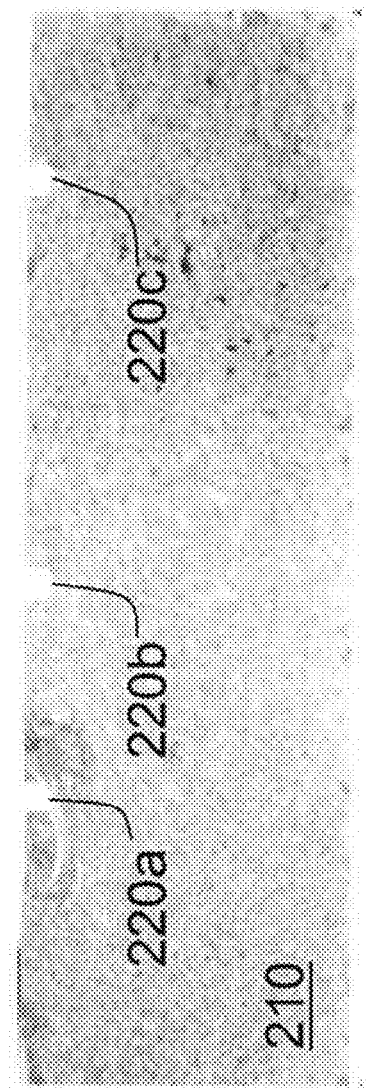
FIG. 2B is a diagram showing a front view of the glass block of FIG. 2A.

FIG. 2A is a diagram showing a top view of a glass block 210 having machined troughs 220a, 220b, 220c (collectively 220), while FIG. 2B is a diagram showing a front view of the glass block 210. For the particular embodiment of FIGS. 2A and 2B, three troughs 220 are machined into a transparent high-index glass block 210 with a refractive index of approximately 1.7 to create channels in which the optical fiber would eventually be situated. The particular dimensions of the glass block 210 of FIGS. 2A and 2B are approximately 55 millimeters (mm)×16 mm×4 mm. The width and depth of the troughs 220 are approximately 500 μm. Once an optical fiber is placed within one of the troughs 220, another glass block (not shown) is placed atop the glass block 210 of FIGS. 2A and 2B, thereby effectively encasing the optical fiber within the high-index glass block 210.

By way of example, mounting the glass block 210 onto a 15° C. water-cooled cold plate using a thermal compound and injecting 80 W of power at 976 nm into a bare coreless 330 μm optical fiber that is situated within a trough 220 results in an approximately-12 decibels (dB) extinction of cladding light that is propagating in the coreless fiber. For this particular example, surface temperature as a function of optical power shows a rise of less than 0.3° C./W. Thus, at 100 W, one expects the temperature to reach approximately 42° C. This rise in temperature can be reduced by increasing the dimensions of the glass block 210. Additionally, more heat can be removed from the system by surrounding the apparatus with a cold plate on all sides or increasing the length of the optical fiber that is embedded in the glass block 210.

By providing this type of heat-extraction mechanism, the problems associated with excess cladding light in high-power optical systems can be ameliorated. Additionally, careful control of the dimensions and materials for the apparatus permits use in very high-power systems in which multiple kW-class devices are multiplexed together. Thus, the disclosed embodiments can be used in systems that accommodate power levels of hundreds of kW, and even up to the megawatt (MW) range.

Although exemplary embodiments have been shown and described, it will be clear to those of ordinary skill in the art that a number of changes, modifications, or alterations to the disclosure as described may be made. All such changes, modifications, and alterations should therefore be seen as within the scope of the disclosure.

What is claimed is:

1. An apparatus, comprising:
   a glass block comprising a channel for an optical fiber, the optical fiber having a cladding, the cladding having a refractive index of $n_1$, the lass block having a refractive index of $n_3$ such that $n_3 \geq n_1$;
   a thermal compound; and
   a metal housing located external to the glass block, the thermal compound being located at a glass-metal interface between the metal housing and the glass block, a heat flux at the thermal compound being less than approximately 200 Watts per square inch (W/in²).

2. The apparatus of claim 1, the metal housing having a thermal conductivity that is greater than approximately 200 Watts per meter-degrees Celsius (W/m-° C.).

3. The apparatus of claim 1, further comprising:
   a cold plate in contact with the metal housing, the cold plate to remove heat from the apparatus.

4. The apparatus of claim 3, the cold plate exhibiting a thermal resistance that is less than approximately 0.15 degrees Celsius-square inches per Watt (° C.-in$^2$/W).

5. The apparatus of claim 1, the glass block having a transmittance of $\tau_{glass}$ such that $\tau_{glass} \geq 0.999$ over a distance of approximately 1 centimeter (cm).

6. The apparatus of claim 1, further comprising:
a fluid to surround the fiber, the fluid having an internal transmittance of $\tau_{fluid}$ such that $\tau_{fluid} \geq 0.999$ over a distance of approximately 100 micrometers (μm).

7. The apparatus of claim 1, further comprising:
a fluid to surround the fiber, the fluid having a refractive index of $n_2$ such that $n_3 \geq n_2 \geq n_1$.

8. The apparatus of claim 1, the channel in the glass block being a hole bored in the glass block.

* * * * *